United States Patent
DiFoggio et al.

(10) Patent No.: US 11,193,826 B2
(45) Date of Patent: Dec. 7, 2021

(54) DERIVATIVE RATIO TEST OF FLUID SAMPLING CLEANUP

(71) Applicants: Rocco DiFoggio, Houston, TX (US); Bernardo E. Pohl, Houston, TX (US)

(72) Inventors: Rocco DiFoggio, Houston, TX (US); Bernardo E. Pohl, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 350 days.

(21) Appl. No.: 16/293,184

(22) Filed: Mar. 5, 2019

(65) Prior Publication Data
US 2019/0301936 A1 Oct. 3, 2019

Related U.S. Application Data

(60) Provisional application No. 62/649,348, filed on Mar. 28, 2018.

(51) Int. Cl.
*G01J 3/433* (2006.01)
*E21B 49/10* (2006.01)
*E21B 49/08* (2006.01)

(52) U.S. Cl.
CPC .............. *G01J 3/433* (2013.01); *E21B 49/10* (2013.01); *E21B 49/0875* (2020.05)

(58) Field of Classification Search
CPC ....... E21B 49/0875; E21B 49/10; G01J 3/433
See application file for complete search history.

(56) References Cited

U.S. PATENT DOCUMENTS

| | | |
|---|---|---|
| 6,274,865 B1 | 8/2001 | Schroer et al. |
| 6,350,986 B1 | 2/2002 | Mullins et al. |
| 6,714,872 B2 | 3/2004 | DiFoggio et al. |
| 7,299,136 B2 | 11/2007 | DiFoggio et al. |
| 7,346,460 B2 | 3/2008 | DiFoggio et al. |
| 7,711,488 B2 | 5/2010 | Hsu et al. |
| 9,606,260 B2 | 3/2017 | Zuo et al. |
| 2005/0016727 A1* | 1/2005 | Fields .................. E21B 33/138 166/298 |

(Continued)

OTHER PUBLICATIONS

Pepper, Darrell W., and Heinrich, Juan C.. Finite Element Methods: Basic Concepts and Applications. United Kingdom, Taylor & Francis. (Year: 1992).*

(Continued)

*Primary Examiner* — Michael J Dalbo
(74) *Attorney, Agent, or Firm* — Cantor Colburn LLP

(57) ABSTRACT

A method for performing a formation fluid test in a borehole penetrating a subsurface formation includes disposing a fluid tester in the borehole, extracting a sample of fluid from the subsurface formation using the fluid tester, and analyzing the sample using the fluid tester to provide test data for a process used to analyze the sample. The method also includes fitting an equation to the test data and calculating a ratio of a first derivative of the equation to a second derivative of the equation. The method further includes continuing to extract the sample from the subsurface formation in response to the ratio indicating a clean sample will be forthcoming and terminating the extracting of the sample from the subsurface formation in response to the ratio indicating a clean sample will not be forthcoming.

20 Claims, 6 Drawing Sheets

(56) References Cited

U.S. PATENT DOCUMENTS

| | | | |
|---|---|---|---|
| 2005/0213684 A1* | 9/2005 | Flake .................... | G01R 31/088 375/295 |
| 2006/0236758 A1* | 10/2006 | DiFoggio .............. | E21B 49/005 73/152.55 |
| 2007/0129901 A1 | 6/2007 | DiFoggio et al. | |
| 2009/0139345 A1* | 6/2009 | Xie .......................... | G01F 15/02 73/861.04 |
| 2014/0196532 A1* | 7/2014 | Bullock .................. | E21B 49/10 73/152.24 |
| 2017/0067338 A1* | 3/2017 | Gisolf ..................... | E21B 49/10 |
| 2017/0370215 A1* | 12/2017 | Hsu ......................... | E21B 47/07 |

OTHER PUBLICATIONS

Notification of Transmittal of the International Search Report and the Written Opinion of the International Searching Authority; PCT/US2019/023871; dated Jul. 8, 2019; 12 pages.

* cited by examiner

Derivation of Fitting Coefficients when Derivative Ratio, $A'/A''$, is Linear

<u>Power Law:</u> The ratio, $A'/A''$, *varies linearly* with t, its Slope $= -1/(p+1)$ Asymptotic when $p > 0$.

Rises and levels off to $A_0$ when $m < 0$. Falls and levels off to $A_0$ when $m > 0$.

Goal is to solve for $A_0$, $m$, $t_0$, and $p$.

Here $\quad A(t) = A_0 + m\,(t-t_0)^{-p}$

Then, $\quad A' = dA/dt = -p\,m\,(t-t_0)^{-p-1}$ $A'' = d^2A/dt^2 = -p\,(-p-1)\,m\,(t-t_0)^{-p-2}$ $A'/A'' = (dA/dt) / (d^2A/dt^2) = -(t-t_0)/(p+1) = [-t/(p+1)] + [t_0/(p+1)]$ Regressing $A'/A''$ vs t, Slope $= [-1/(p+1)]$ Intercept $= [t_0/(p+1)]$ $\quad$ So $\quad p = -(1+1/\text{Slope}) \quad t_0 = -(\text{Intercept}/\text{Slope})$ Next, using $t_0$ and p, regress $A(t)$ vs $(t-t_0)^{-p}$ to get a *new* Slope=m, Intercept = $A_0$ As time goes to zero, $A(t) = A_0 - m\,t_0^{-p}$. At infinite time, $A(t) = A_0$ <u>Exponential:</u> The ratio, $A'/A''$, *is a constant*, $-\tau$, which is a line of Slope Zero Asymptotic when $\tau > 0$. Goal is to solve for $A_0$, $A_2$, and $\tau$.

Here $\quad A(t) = A_0 + A_1 e^{-(t-t_0)/\tau} = A_0 + A_2 e^{-t/\tau}$ where $A_2 = A_1 e^{t_0/\tau}$ Then, $A' = dA/dt = (-1/\tau)\,A_1 e^{-(t-t_0)/\tau}$ $\quad A'' = d^2A/dt^2 = (+1/\tau^2)\,A_1 e^{-(t-t_0)/\tau}$ Ratio, $A'/A'' = (dA/dt)/(d^2A/dt^2) = -\tau = $ Intercept, regardless of $t_0$ or sign of $A_2$.

Note: $A(t) = A_0 - \tau A'(t) = A_0 - \tau\,(-1/\tau)\,(A_1 e^{t_0/t})\,[e^{-t/\tau}] = A_0 + A_2\,[e^{-t/\tau}]$ As time goes to zero, $A(t) = A_0 + A_2$. At infinite time, $A(t) = A_0$.

If data *rises* and levels off, then $A_0$ is positive *but* $A_1$ and $A_2$ will both be *negative*.

If data *falls* and levels off, then $A_0$ is positive *and* $A_1$ and $A_2$ will both be *positive*.

FIG. 5B

DERIVATIVE RATIO TEST OF FLUID SAMPLING CLEANUP

CROSS REFERENCE TO RELATED APPLICATIONS

This application claims the benefit of an earlier filing date from U.S. Provisional Application Ser. No. 62/649,348 filed Mar. 28, 2018, the entire disclosure of which is incorporated herein by reference.

BACKGROUND

Geologic formations may be used for many applications such as hydrocarbon production, geothermal production, and carbon dioxide sequestration. Typically, boreholes are drilled into the formations to access them. Various downhole tools or instruments may be conveyed in the boreholes in order to characterize the formations and fluids within. Characterization of the formations and the fluids within provides useful information related to the intended use of the formations so that drilling and production resources can be used efficiently.

One type of downhole instrument is a fluid tester that extracts a sample of the formation fluid and performs analyses of that sample using a downhole analyzer. In general, early in the process of pumping fluid from the formation, the fluid is highly contaminated with mud filtrate and, as pumping continues, the fluid typically cleans up. Often, after pumping for an hour or two, a sufficiently clean formation fluid sample is collected in a downhole sample tank whose capacity may be approximately a liter for example. Some fluid analyses may be performed immediately, downhole, during pumping. For more sophisticated analyses, the tank is returned to the surface and its fluid contents may be analyzed in a surface laboratory at some later date. When the mud filtrate is immiscible with the formation fluid that is being pumped from the formation, such as water-based mud (WBM) filtrate when taking a formation crude oil sample or oil-based mud filtrate (OBM) when taking a formation brine sample, then the initial flow consists of mixed phases of oil and water. Such mixed phase flow shows the spectral signatures of both oil and water in a rapidly changing and erratic pattern. Eventually, the spectral signature shows that the flow proceeds to the single phase of formation fluid that one wishes to collect for a sample, which is an obvious and dramatic spectral change. However, when the mud filtrate is miscible with the formation fluid that is being pumped from the formation, such as water-based mud (WBM) filtrate when taking formation brine samples or oil-based mud filtrate (OBM) when taking formation crude oil samples, then the cleanup towards pure formation fluid is more subtle. It is desired to collect as clean a sample as possible within economic reason to ensure that subsequent surface lab analyses reflect the actual formation fluid of interest and not the filtrate. An offshore drilling rig can cost one to two million dollars per day ($42 to $83 thousand per hour), so pumping an extra hour or two to achieve only a marginal improvement in sample purity might not make economic sense. However, on critical wildcat wells, some operators have pumped for 10-12 hours with associated cost. Hence, innovations that improve the speed and efficiency of fluid sample cleanup monitoring would be well received in the drilling and production industries.

BRIEF SUMMARY

Disclosed is a method for performing a formation fluid test in a borehole penetrating a subsurface formation. The method includes: disposing a fluid tester in the borehole; extracting a sample of fluid from the subsurface formation using the fluid tester; analyzing the sample using the fluid tester to provide test data for a process used to analyze the sample; fitting an equation to the test data using a processor; calculating a ratio of a first derivative of the equation to a second derivative of the equation using the processor; continuing to extract the sample from the subsurface formation in response to the ratio indicating a clean sample will be forthcoming; and terminating the extracting of the sample from the subsurface formation in response to the ratio indicating a clean sample will not be forthcoming.

Also disclosed is a system for performing a formation fluid test in a borehole penetrating a subsurface formation. The system includes: a fluid tester conveyable in the borehole by a carrier and configured to extract a sample of fluid from the subsurface formation and to analyze the sample to provide test data for a process used to analyze the sample and a processor. The processor is configured to: fit an equation to the test data; calculate a ratio of a first derivative of the equation to a second derivative of the equation; and determine from the ratio one of (a) a clean sample will be forthcoming and (b) a clean sample will not be forthcoming. The system also includes a user interface configured to provide indication to a user that one of the clean sample will be forthcoming and the clean sample will not be forthcoming in response to the determination by the processor.

BRIEF DESCRIPTION OF THE DRAWINGS

The following descriptions should not be considered limiting in any way. With reference to the accompanying drawings, like elements are numbered alike:

FIGS. 5A and 5B, collectively referred to as FIG. 5, illustrate aspects of an interpretation of a derivative ratio test.

DETAILED DESCRIPTION

Figure 1:
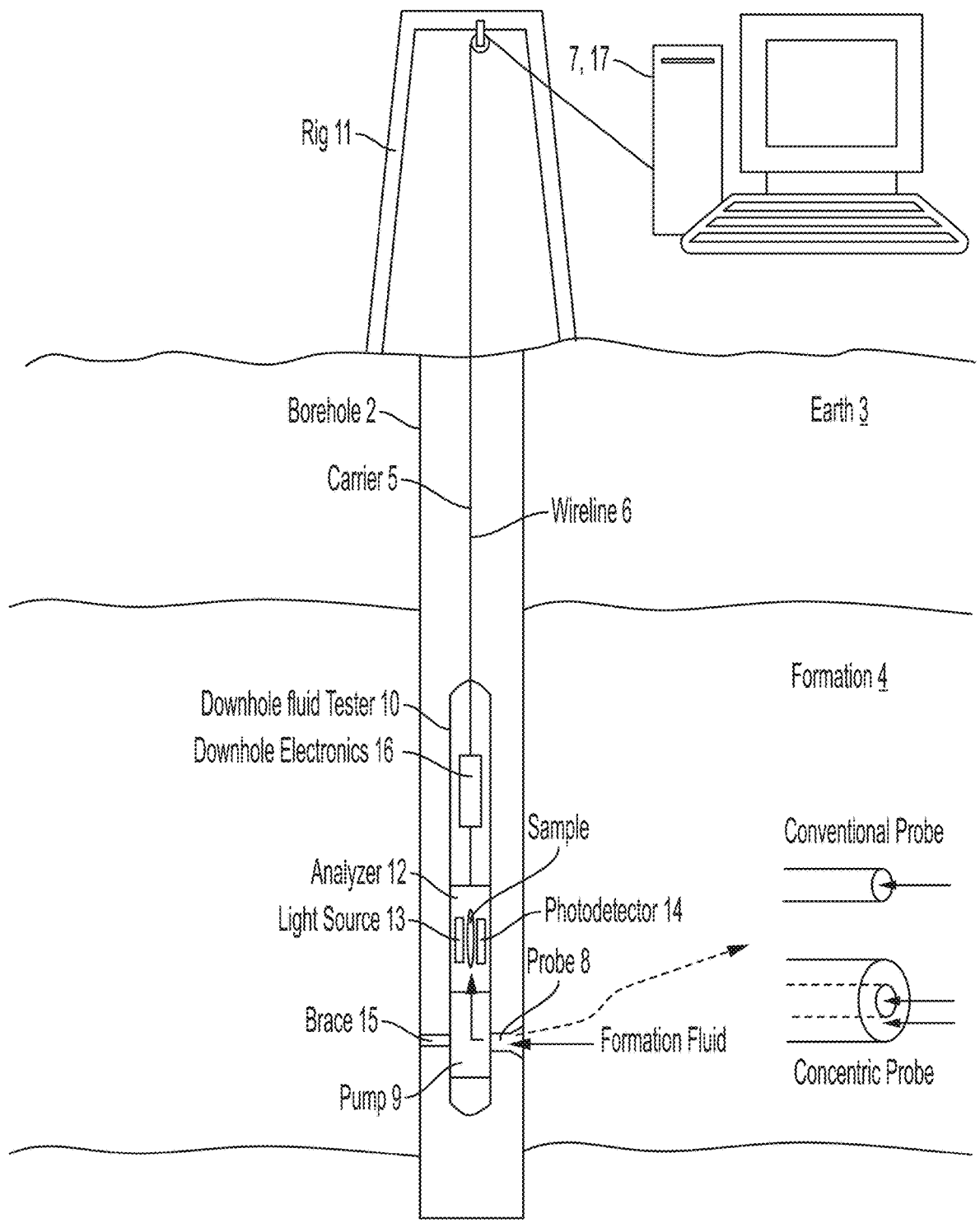
FIG. 1 illustrates a fluid tester tool disposed in a borehole penetrating the earth.

A detailed description of one or more embodiments of the disclosed apparatus and method are presented herein by way of exemplification and not limitation with reference to the Figures.

As noted above, drilling rig time can be very expensive. That is why it is helpful, as disclosed herein, to fit a cleanup curve to a sensor response (e.g., absorbance) in order to forecast the eventual sensor response at terminal purity and to forecast how much more pumping time would be needed to achieve various fractions (such as 95%) of terminal purity. With regard to light absorbance, by Beer's Law, the optical absorbance of the filtrate-contaminated fluid is the volume fraction of filtrate multiplied by the filtrate spectrum plus the volume fraction of formation fluid multiplied by the formation fluid spectrum. As disclosed herein, such cleanup fitting curves may be a Power Law or an Exponential. However, for complete generality, a derivative-ratio method of this disclosure is designed to automatically handle both types of curves. Inability to fit either type of curve can also serve as an early warning that there is a seal leak, formation fracture, or some other problem that would prevent a clean sample from ever being collected no matter how long one pumped and, thereby, to avoid wasting expensive pumping time. In such a case, early in the pumping process, the tool would be unseated, moved, and reseated at another location in the well.

This disclosure addresses the case of miscible fluid contamination. Its benefits include 1) a test of whether the fluid will ever cleanup, 2) a flag as to whether fitting with a Power Law or with an Exponential would be better, and 3) calculating the corresponding best curve fitting coefficients so that the current progress in cleanup can be extrapolated to future times to estimate how much more pumping time is needed.

Methods and apparatuses are presented for obtaining a clean sample of a formation fluid for analysis using a downhole fluid tester disposed in a borehole penetrating a formation of interest. The term "clean" relates to the sample having a selected level of purity (i.e., uncontaminated or nearly uncontaminated by an unwanted fluid, such as mud filtrate). The level of purity, as a fraction of the ultimate level of purity after pumping for an infinite time, is determined by a downhole analyzer that is configured to analyze the sample using a selected method. For teaching purposes, the analysis method discussed is absorbance of light by the sample. For example, if the formation fluid is crude oil, which is dark, and a contaminate is OBM mud filtrate, which is usually more transparent than crude oil, then initially it is expected that early fluid flow would have less absorbance than later fluid flow as the later fluids are contaminated with less filtrate. That is, absorbance at some wavelength (sample darkness) would rise and level off over time. In some cases, when the formation crude oil is very light, the situation is reversed so that the absorbance would fall and level off over time. Other analysis methods could also be monitored over time (or over volume of fluid pumped) such as the fluid's refractive index, sound speed (or its inverse, "slowness"), density, or viscosity.

As absorbance data is obtained over time, a rolling set of small, piecewise quadratic fits to the data is performed to provide a smoothed version of the data. A ratio of a first derivative to a second derivative of that smoothed data with respect to time is then calculated. The plot of the ratio is then used to determine whether further sampling will eventually lead to obtaining a clean sample or whether further sampling will not lead to eventually obtaining a clean sample. If the plot of the ratio indicates that a clean sample will be obtained, then operators will know that their time is not being wasted by waiting for the clean sample. An offshore rig can cost one or two million dollars per day so pumping unnecessarily for ten hours would waste $400 to $800 thousand dollars, which illustrates the commercial importance of having an early test of whether the sample will or will not eventually clean up. If the plot of the ratio indicates that a clean sample will not be obtained, then that can indicate a problem such as a fractured formation, a leaking packer, or a leaking probe seal in the fluid tester as non-limiting examples. In one or more embodiments when a problem is detected, the fluid tester can be moved to a new location in the borehole with fluid testing being repeated at the new location. Alternatively, the fluid tester can be retrieved from the borehole and inspected.

FIG. 1 illustrates a cross-sectional view of an embodiment of a downhole fluid tester tool 10 disposed in a borehole 2 penetrating the earth 3, which includes an earth formation 4. The fluid tester tool 10 is conveyed through the borehole 2 by a carrier 5, which can be an armored wireline as illustrated in an embodiment referred to as wireline logging. Alternatively, the carrier 5 can be a drill string or coiled tubing in an embodiment referred to as logging-while-drilling (LWD) or measurement-while-drilling (MWD). A rig 11 is configured to convey the fluid tester tool 10 in the borehole 2. The carrier 5 may include telemetry 6 for transmitting data to a surface receiver 7, such as a computer processing system 17. In one or more embodiments, the telemetry 6 is a communication line, pulsed-mud, or wired drill pipe. Downhole electronics 16 may perform data processing functions, control operation of the fluid tester tool 10, and/or act as an interface with the telemetry 6.

The downhole fluid tester 10 includes a probe 8 that is configured to extend and seal to a wall of the borehole 2. The probe 8 may include a pliable region that interfaces with and conforms to the borehole wall to provide a seal so that surrounding fluid does not contaminate the sample. In one or more embodiments, the probe 8 is a conventional probe having a single opening or a concentric probe having one or more openings surrounding a central opening. The downhole fluid tester 10 may include a brace 15 that is configured to extend in order to hold the tester 10 in place while the probe 8 seals to the borehole wall. The downhole fluid tester 10 may also include a pump 9 configured to pump and therefore extract a sample of formation fluid via the probe 8. The sample is provided to an analyzer 12 that is configured to measure a characteristic of the sample that is indicative of an amount of contamination in the sample. In one or more embodiments, analyzer 12 measures light absorbance by the sample and provides absorbance data values to the surface receiver 7. In one or more embodiments, a light source 13 illuminates the sample and a photodetector 14 measures an amount of light that is not absorbed by the sample. In this embodiment, the computer processing system 17 is configured to use the absorbance data values to calculate the ratio of the first and second derivatives of an equation fit to the data values over time. Using the calculated ratio, the computer processing system 17 can provide output to a user where the output indicates if the sampling over time will provide a clean sample or not. In addition, the computer processing system 17 can provide an amount of time the pump 9 must continue pumping in order to obtain a sample with a desired or selected amount of purity.

Taking the ratio of the first to second derivative of the piecewise smoothed fluid sampling cleanup trend can be a useful test that can be displayed to a user in real time while pumping fluid samples during formation testing. For conventional probe sampling, this ratio is expected to be a straight line of negative slope between zero and minus one (Power Law fit). For concentric probe sampling, this ratio is expected to be a horizontal line (Exponential fit). If there is a seal leak, formation fracture, or some other problem that will prevent the user from ever collecting a clean sample, then this ratio will either not be a straight line or it will be a straight line with a positive slope or a straight line with negative slope that is more negative than minus one. Therefore, this test can serve as an early warning to the field engineer to stop pumping and to reset a packer elsewhere. This test can be useful when performing downhole fluid sampling, there the progress of sample cleanup is monitored while pumping by using a downhole fluid analyzer and fitting a curve to its data and then extrapolating the trend in order to estimate the percentage of the ultimate endpoint value that one has obtained so far. Also, the time remaining to get to the clean sample can be estimated.

Limits for the slope of the line can be set so that line can be characterized as being either "horizontal" or "negative sloping." In addition, limits can be set for the straightness of the curve of the ratio to identify it as being a line or not. For absorbance data (A) versus time in seconds, a slope that is between −0.1 and +0.1 can be considered horizontal in one or more embodiments. This guideline can be revised for the case of absorbance versus volume by rescaling by the normal flow rate, which can be 10-15 cc/sec for the standard probe and 0.1-0.2 cc/sec (seldom above 3 to 4 cc/sec) for the central line of the concentric probe.

Figure 2:
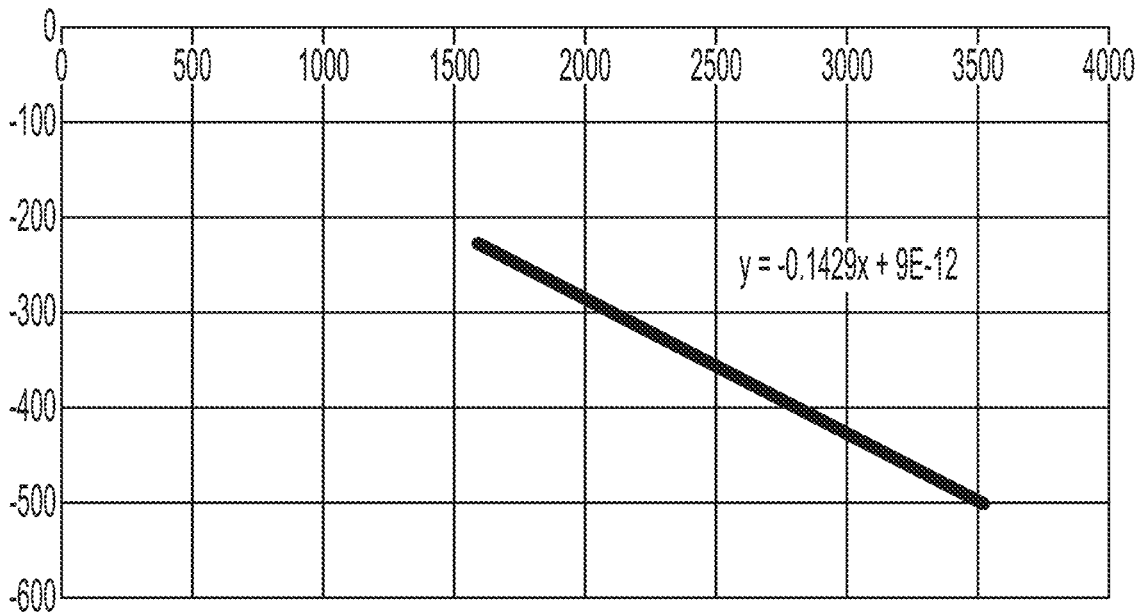
FIG. 2 illustrates a graph of a ratio of a first derivative of absorbance to a second derivative of absorbance over time having a negative slope.

Next, Asymptotic Power Law fit with respect to the ratio of the first (A') and second (A") derivatives is discussed. The Asymptotic Power Law: Ratio, A'/A", varies linearly with t (where "t" in this disclosure may be used to represent time) with a slope of $-1/(p+1)$ so that $p=-1-1/\text{slope}$. See FIG. 2. By the process below, $A_0$, m, $t_0$, and p can be solved for. Here, p must be >0 so that the $t^{-p}$ term will get smaller with increasing time. If the A'/A" slope=−1, then p=0 and it is not a Power Law for there is no longer be any dependence on time. For p<0, the $t^{-p}$ term gets larger with time so it is not an asymptotic curve. It is as an Asymptotic Power fit only when the A'/A" slope is between zero and minus one so that p>0.

The ratio rises and levels off to $A_0$ when m<0, while the ratio falls and levels off to $A_0$ when m>0.

If $A(t)=A0+m\ (t-t_0)^{-p}$, then, $A'=dA/dt=-p\ m(t-t_0)^{-p-1}$, $A''=d^2A/dt^2=-p(-p-1)\ m\ (t-t_0)^{-p-2}$, and $A'/A''=(dA/dt)/(d^2A/dt^2)=-(t-t_0)/(p+1)=[-t/(p+1)]+[t_0/(p+1)]$.

So regressing A'/A" vs t provides Slope=$[-1/(p+1)]$ and Intercept=$[t_0/(p+1)]$. Thus, p=$-(1+1/\text{Slope})$ and $t_0=-(\text{Intercept/Slope})$.

Using $t_0$ and p, regress A(t) vs $(t-t_0)^{-p}$ whose new Slope=m and Intercept=$A_0$.

Thus, $t\to 0\Rightarrow A(t)\to A_0-m\ t_0^{-p}$; $t\to\infty\Rightarrow A(t)\to A_0$.

FracTermPurity=$|(A_{current}-A_0+m\ t_0^{-p})/(m\ t_0^{-p})|$ where FracTermPurity represents Fractional Terminal Purity or the fraction of the way to terminal or ultimate purity at infinite pumping time.

Assuming A(t)=0 at t=0, then $A_0=m\ t_0^{-p}$ and FracTermPurity=$|A_{current}/A_0|$.

Figure 3:
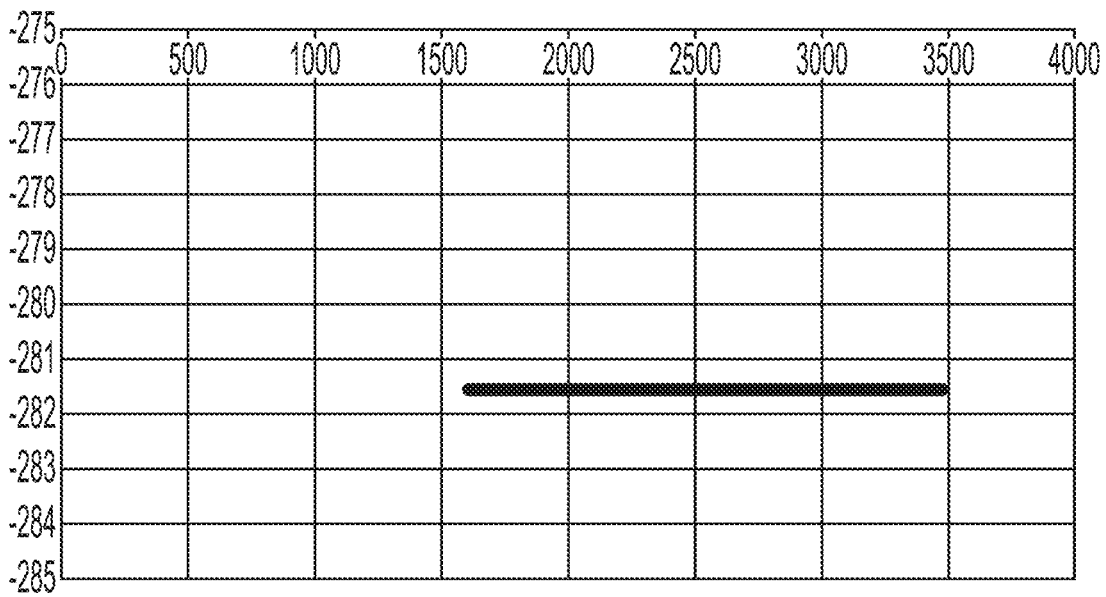
FIG. 3 illustrates a graph of a ratio of a first derivative of absorbance to a second derivative of absorbance over time having a zero slope.

Next, Exponential Power Law fit with respect to the ratio of the first (A') and second (A") derivatives is discussed. The Exponential Law Fit: Ratio, A'/A", is a constant, −τ, so slope is zero. See FIG. 3. By the process below, $A_0$, $A_2$, and τ can be solved for. It is not necessary to solve separately for $A_1$ or $t_0$, because $A_2$ combines the effects of both, which is enough.

If $A(t)=A_0+A_1\ e^{-(t-to)/\tau}=A_0+A_2\ e^{-t/\tau}$ where $A_2=A_1\ e^{to/\tau}$, then. $A'=dA/dt=(-1/\tau)\ A_1\ e^{-(t-to)/\tau}$ and $A''=d^2A/dt^2=(+1/\tau^2)\ A_1\ e^{-(t-to)/\tau}$.

Ratio, $A'/A''=(dA/dt)/(d^2A/dt^2)=-\tau$=Intercept regardless of $t_0$ or sign of $A_2$.

Note: $A(t)=A_0-\tau\ A'(t)=A_0-\tau(-1/\tau)\ A_1\ e^{to/\tau})\ [e^{-t/\tau}]=A_0+A_2[e^{-t/\tau}]$.

When time, t=0, then $A(t)=A_0+A_2$. At infinite time, $A(t)=A_0$. Fraction_of_Terminal_Purity=$(A_0+A_2-A_{current})/A_2$.

If data rises and levels off, then $A_0$ is positive but $A_1$ and $A_2$ will both be negative. For rising and leveling off, $A_2=A_1\ e^{to/\tau}<0$.

The curve fit starts out at $A_0+A_2$, which is below $A_0$, and ultimately rises to $A_0$ with increasing time, as an ever-smaller magnitude, $|A_2\ e^{-t/\tau}|$, gets subtracted from $A_0$. Using τ from above, regress A(t) vs $e^{-t/\tau}$ to get Intercept=$A_0>0$ and Slope=$A_2<0$.

If data falls and levels off, then $A_0$ is positive and $A_1$ and $A_2$ will both be positive. For falling and leveling off, $A_2=A_1\ e^{to/\tau}>0$. The curve fit starts out at $A_0+A_2$, which is above $A_0$, and ultimately fills to $A_0$ with increasing time, as an ever-smaller magnitude, $|A_2\ e^{-t/\tau}|$, gets added to $A_0$. Using τ from above, regress A(t) vs $e^{-t/\tau}$ to get Intercept=$A_0>0$ and Slope=$A_2>0$.

Figure 4:
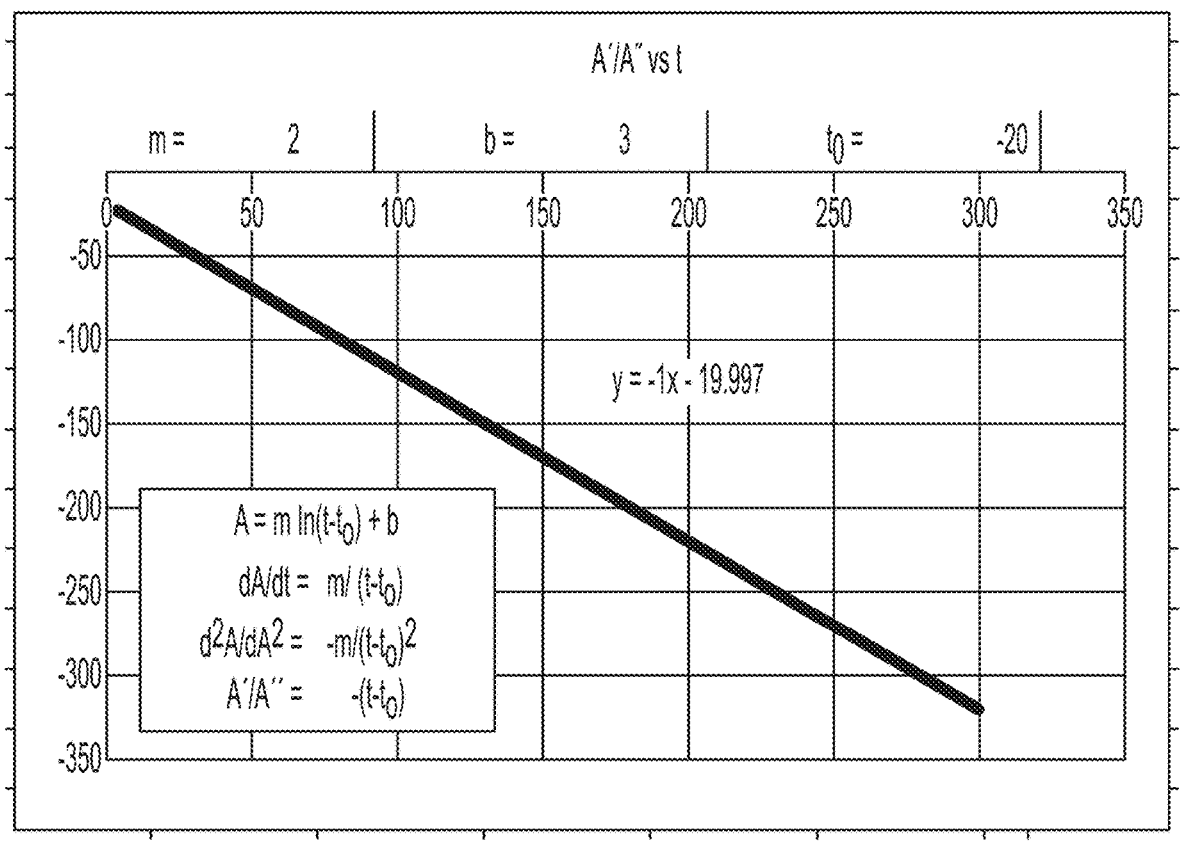
FIG. 4 illustrates a graph of a ratio of a first derivative of absorbance to a second derivative of absorbance over time having a negative slope where the absorbance equation includes a logarithm.

Next, Semi-log in time fit with respect to the ratio of the first (A') and second (A") derivatives is discussed. Ratio, A'/A", varies linearly with t, with Slope=−1, Intercept=$t_0$. See FIG. 4. This is a non-asymptotic fit, which indicates that cleanup will never be achieved.

If $A(t)=A_0+m\ \ln(t-t_0)$, then $A'=dA/dt=m\ (t-t_0)^{-1}$ and $A''=d^2A/dt^2=-m(t-t_0)^{-2}$. Thus, Ratio, $A'/A''=-(t-t_0)=-t+t_0$.

Here A'/A" versus t has a Slope=−1 and an Intercept=$t_0$.

This fit is not an asymptotic Power Law fit for which p=$-(1+1/\text{Slope})$ for then, p=0 if Slope=−1 but p must be positive for an asymptotic Power Law $t^{-p}$.

Figure 5A:
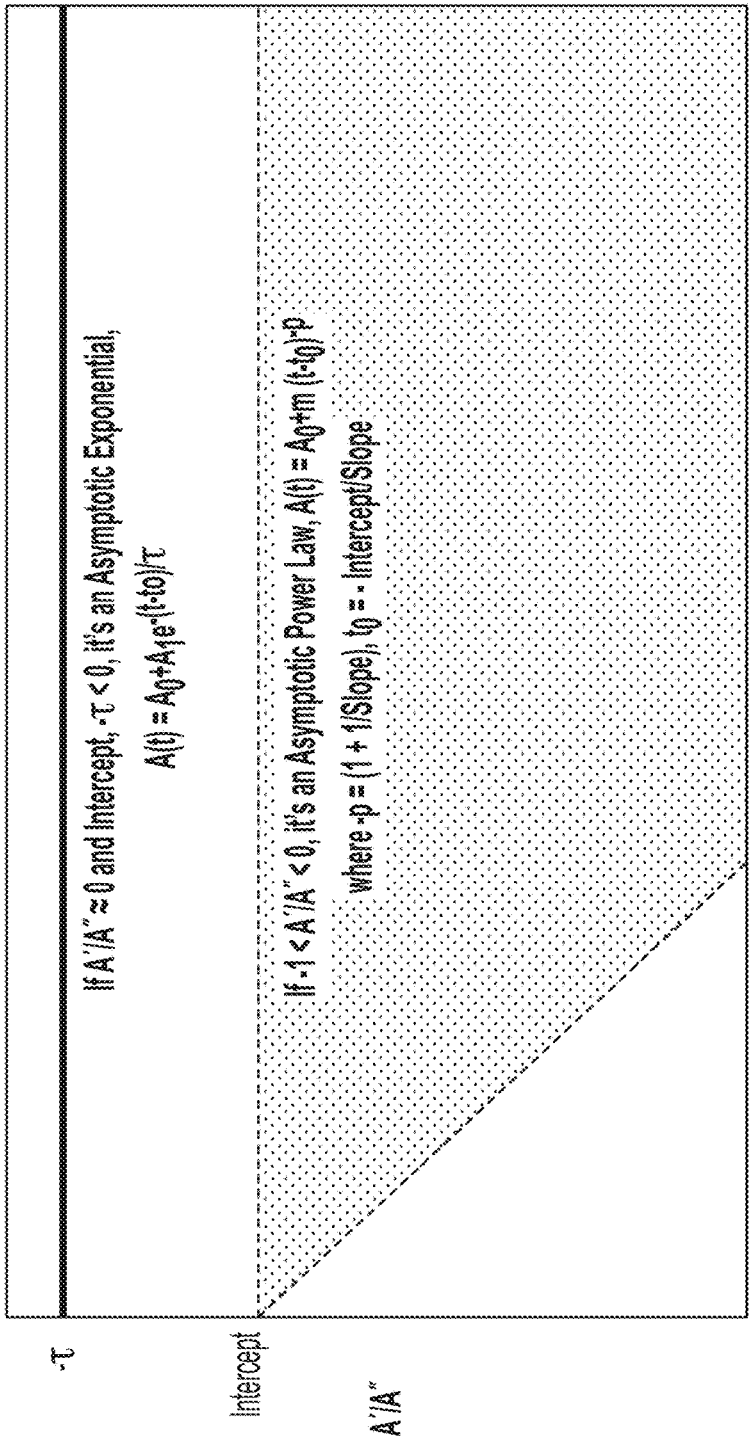

FIG. 5A illustrates aspects of Criteria for Straight Line Tests of Derivative Ratio, A'/A", vs Time. When the fluid property data are fit by an asymptotic Power Law (−1<A'/A"<0) or by an Exponential (A'/A"≈0), then it is appropriate to continue pumping to some desired fraction of terminal purity. When the fluid property data are fit by a non-asymptotic equation, then it is appropriate to terminate extracting sample from the subsurface formation because a clean sample will not be forthcoming. FIG. 5B illustrates aspects of a derivation of fitting coefficients when the derivative ratio, A'/A", is linear over time and A'/A"≈0 (Exponential) or −1<A'/A"<0 (asymptotic Power Law).

Figure 6:
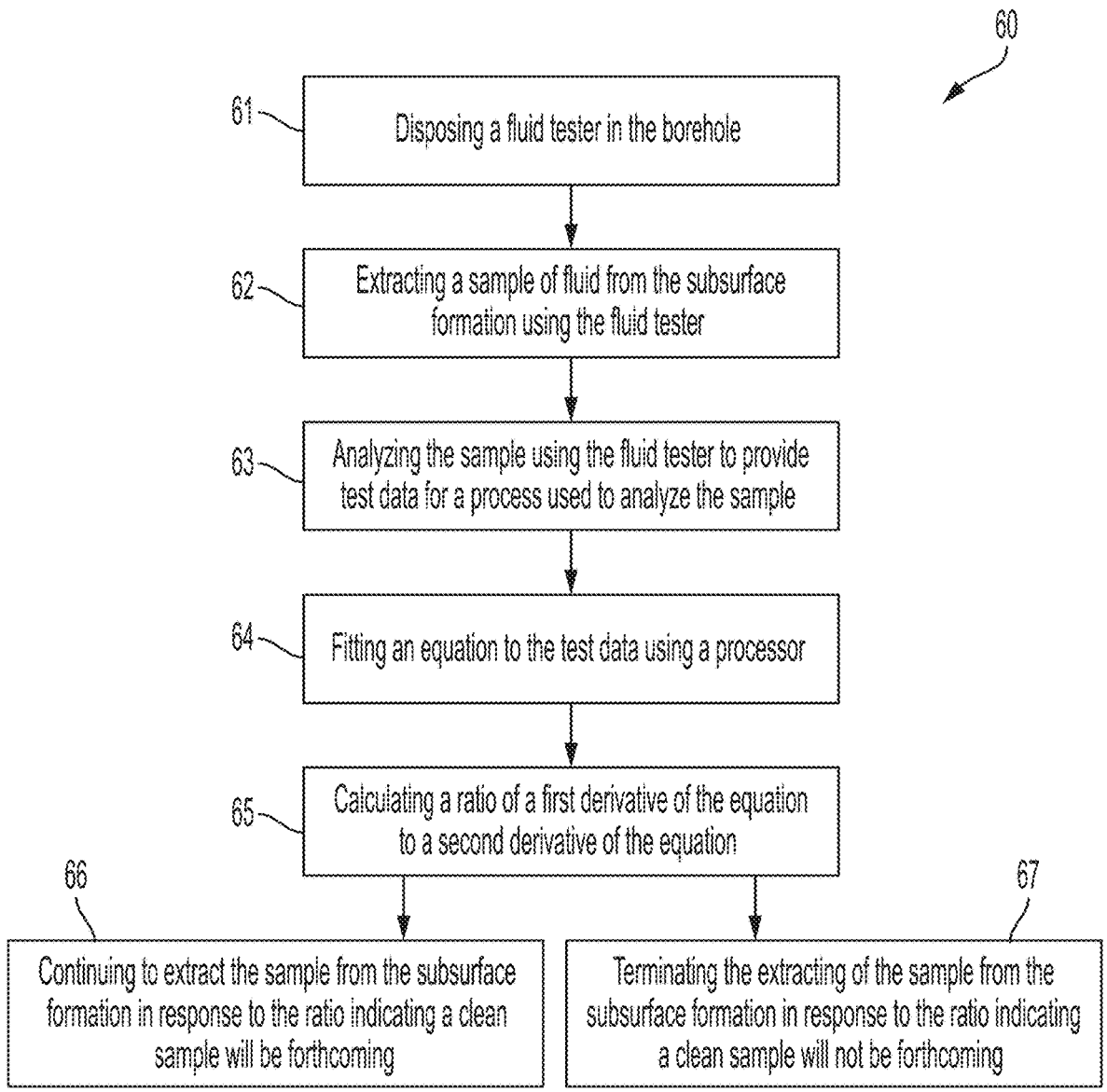
FIG. 6 is a flow chart for a method for performing a formation fluid test.

FIG. 6 is a flow chart for a method 60 for performing a formation fluid test in a borehole penetrating a subsurface formation. Block 61 calls for disposing a fluid tester in the borehole. Block 62 calls for extracting a sample of fluid from the subsurface formation using the fluid tester. Block 63 calls for analyzing the sample using the fluid tester to provide test data for a process used to analyze the sample. Non-limiting embodiments of the process include measuring at least one of the fluid sample's light absorbance, refractive index, sound speed (or its inverse, "slowness"), density, and/or viscosity. Block 64 calls for fitting an equation to the test data using a processor. In general, the test data may be a function of time (t) and, thus, the equation is also a function of time. Block 65 calls for calculating a ratio of a first derivative of the equation to a second derivative of the equation. Block 66 calls for continuing to extract the sample from the subsurface formation in response to the ratio indicating a clean sample will be forthcoming. Block 67 calls for terminating the extracting of the sample from the subsurface formation in response to the ratio indicating a clean sample will not be forthcoming.

The method 60 may also include relocating the formation tester to a new location and performing the formation fluid test at the new location, moving a packer, or inspecting the fluid tester in response to the ratio indicating a clean sample will not be forthcoming.

The method 60 may also include estimating an amount of time to continue extracting the sample in order to obtain a clean sample by calculating curve fitting coefficients for the equation. The clean sample can be at terminal or asymptotic purity or a desired fraction of the terminal or asymptotic purity. In one or more embodiments, the equation is a function of time or has a time component. Hence, by inputting a desired fraction of terminal or asymptotic purity into the equation, the time to reach that desired fraction can be solved for.

Some novel features of the disclosure include informing a field engineer when to give up on a particular location, to stop pumping, and/or to reset the packer at another location because the sample is never going to clean up. Also, the disclosure can indicate which of the two expected trends, a power law or an exponential curve, the observed cleanup is following.

Set forth below are some embodiments of the foregoing disclosure:

Embodiment 1

A method for performing a formation fluid test in a borehole penetrating a subsurface formation, the method comprising: disposing a fluid tester in the borehole: extracting a sample of fluid from the subsurface formation using the fluid tester; analyzing the sample using the fluid tester to provide test data for a process used to analyze the sample; fitting an equation to the test data using a processor; calculating a ratio of a first derivative of the equation to a second derivative of the equation using the processor; continuing to extract the sample from the subsurface formation in response to the ratio indicating a clean sample will be forthcoming; and terminating the extracting of the sample from the subsurface formation in response to the ratio indicating a clean sample will not be forthcoming.

Embodiment 2

The method according to any prior embodiment, wherein the analyzing comprises measuring at least one of the sample's light absorbance, refractive index, sound speed or its inverse slowness, density, and viscosity.

Embodiment 3

The method according to any prior embodiment, wherein the equation is developed by fitting a series of piecewise fits of a quadratic equation to the test data.

Embodiment 4

The method according to any prior embodiment, wherein the sample is extracted using a probe having a single opening and the ratio being characterized within a specified limit as having a slope greater than minus one and less than or equal to zero is indicative that a clean sample will be forthcoming.

Embodiment 5

The method according to any prior embodiment, wherein the ratio comprises an asymptotic power law fit to the test data.

Embodiment 6

The method according to any prior embodiment, wherein the sample is extracted using a concentric probe having a first opening to extract the sample and a second opening surrounding the first opening and the ratio being characterized within a specified limit as having a horizontal line is indicative that a clean sample will be forthcoming.

Embodiment 7

The method according to any prior embodiment, wherein the ratio comprises an exponential power law fit.

Embodiment 8

The method according to any prior embodiment, further comprising resetting a packer in the borehole to another location in the borehole and extracting another sample at another location in the borehole.

Embodiment 9

The method according to any prior embodiment, further comprising estimating an amount of time to continue extracting the sample in order to obtain a clean sample by calculating curve fitting coefficients for the equation.

Embodiment 10

A system for performing a formation fluid test in a borehole penetrating a subsurface formation, the system comprising: a fluid tester conveyable in the borehole by a carrier and configured to extract a sample of fluid from the subsurface formation and to analyze the sample to provide test data for a process used to analyze the sample; a processor configured to: fit an equation to the test data; calculate a ratio of a first derivative of the equation to a second derivative of the equation; and determine from the ratio one of (a) a clean sample will be forthcoming and (b) a clean sample will not be forthcoming; a user interface configured to provide indication to a user that one of the clean sample will be forthcoming and the clean sample will not be forthcoming in response to the determination by the processor.

Embodiment 11

The system according to any prior embodiment, further comprising a probe having a single opening configured to extract the sample and the processor is further configured to identify the ratio as being characterized within a specified limit as having a slope between and inclusive of zero and minus one in order to indicate that a clean sample will be forthcoming.

Embodiment 12

The system according to any prior embodiment, further comprising a concentric probe having a first opening to extract the sample and a second opening surrounding the first opening and the processor is further configured to identify the ratio as being characterized within a specified limit as having a horizontal line to indicate that a clean sample will be forthcoming.

Embodiment 13

The system according to any prior embodiment, wherein the fluid tester is configured to measure at least one of the sample's light absorbance, refractive index, sound speed or its inverse slowness, density, and/or viscosity.

Embodiment 14

The system according to any prior embodiment, wherein the processor is further configured to fit a series of piecewise fits of a quadratic equation to the test data in order to fit the equation to the test data.

Embodiment 15

The system according to any prior embodiment, wherein the processor is further configured to estimate an amount of time to continue extracting the sample in order to obtain a clean sample by calculating curve fitting coefficients for the equation.

Embodiment 16

The system according to any prior embodiment, wherein the carrier comprises one of a wireline, a slickline, a drill string, and coiled tubing.

In support of the teachings herein, various analysis components may be used, including a digital and/or an analog system. For example, the fluid tester 10, downhole electronics 16, and/or the surface computer processing system 17 may include digital and/or analog systems. The system may have components such as a processor, storage media, memory, input, output, communications link (wired, wireless, optical or other), user interfaces (e.g., a display or printer), software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing aspects of the teachings herein. For example, a power supply (e.g., at least one of a generator, a remote supply and a battery, magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

The term "carrier" as used herein means any device, device component, combination of devices, media and/or member that may be used to convey, house, support or otherwise facilitate the use of another device, device component, combination of devices, media and/or member. Other exemplar) non-limiting carriers include drill strings of the coiled tube type, of the jointed pipe type and any combination or portion thereof. Other carrier examples include casing pipes, wirelines, wireline sondes, slickline sondes, drop shots, bottom-hole-assemblies, drill string inserts, modules, internal housings and substrate portions thereof.

Elements of the embodiments have been introduced with either the articles "a" or "an." The articles are intended to mean that there are one or more of the elements. The terms "including" and "having" and the like are intended to be inclusive such that there may be additional elements other than the elements listed. The conjunction "or" when used with a list of at least two terms is intended to mean any term or combination of terms. The term "configured" relates one or more structural limitations of a device that are required for the device to perform the function or operation for which the device is configured.

The flow diagram depicted herein is just an example. There may be many variations to this diagram or the steps (or operations) described therein without departing from the spirit of the invention. For instance, the steps may be performed in a differing order, or steps may be added, deleted or modified. All of these variations are considered a part of the claimed invention.

The disclosure illustratively disclosed herein may be practiced in the absence of any element which is not specifically disclosed herein.

While one or more embodiments have been shown and described, modifications and substitutions may be made thereto without departing from the scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A method for performing a formation fluid test in a borehole penetrating a subsurface formation, the method comprising:
   disposing a fluid tester in the borehole;
   extracting a sample of fluid from the subsurface formation using the fluid tester;
   analyzing the sample using the fluid tester to provide test data over time for a process used to analyze the sample;
   fitting an equation to the test data over time using a processor, the equation comprising a series of piecewise non-asymptotic equations;
   calculating a ratio over time of a first derivative of the equation to a second derivative of the equation using the processor;
   continuing to extract the sample from the subsurface formation in response to the ratio over time indicating a clean sample will be forthcoming, wherein the ratio over time indicates the equation is asymptotic; and
   terminating the extracting of the sample from the subsurface formation in response to the ratio over time indicating a clean sample will not be forthcoming, wherein the ratio over time indicates the equation is non-asymptotic.

2. The method according to claim 1, wherein the analyzing comprises measuring at least one of the sample's light absorbance, refractive index, sound speed or its inverse slowness, density, and viscosity.

3. The method according to claim 1, wherein the equation is developed by fitting a series of piecewise fits of a quadratic equation to the test data over time.

4. The method according to claim 1, wherein the sample is extracted using a probe having a single opening and the ratio over time being characterized within a specified limit as having a slope greater than minus one and less than or equal to zero is indicative that a clean sample will be forthcoming.

5. The method according to claim 4, wherein the ratio over time comprises an asymptotic power law fit to the test data.

6. The method according to claim 1, wherein the sample is extracted using a concentric probe having a first opening to extract the sample and a second opening surrounding the first opening and the ratio over time being characterized within a specified limit as having a horizontal line is indicative that a clean sample will be forthcoming.

7. The method according to claim 6, wherein the ratio over time indicates that the equation comprises an exponential power law fit.

8. The method according to claim 1, further comprising resetting a packer in the borehole to another location in the borehole and extracting another sample at another location in the borehole.

9. The method according to claim 1, further comprising estimating an amount of time to continue extracting the sample in order to obtain a clean sample by calculating curve fitting coefficients for the equation.

10. The method according to claim 1, wherein the ratio over time one of (i) not being a straight line, (ii) being a straight line with a positive slope, (iii) being a straight line of zero slope with an intercept greater that zero, (iv) being a straight line with negative slope that is more negative than minus one, or (v) being a straight line of slope negative one is indicative of the equation being non-asymptotic.

11. The method according to claim 1, wherein the ratio over time one of (i) being a straight line of zero slope and intercept less than zero or (ii) being a straight line of slope less than zero and greater than minus one is indicative of the equation being asymptotic.

12. A system for performing a formation fluid test in a borehole penetrating a subsurface formation, the system comprising:
a fluid tester conveyable in the borehole by a carrier and configured to extract a sample of fluid from the subsurface formation and to analyze the sample to provide test data over time for a process used to analyze the sample;
a processor configured to:
fit an equation to the test data over time;
calculate a ratio over time of a first derivative of the equation to a second derivative of the equation; and
determine from the ratio over time one of (a) a clean sample will be forthcoming, wherein the ratio over time indicates the equation is asymptotic or (b) a clean sample will not be forthcoming, wherein the ratio over time indicates the equation is non-asymptotic;
a user interface configured to provide indication to a user that one of the clean sample will be forthcoming or the clean sample will not be forthcoming in response to the determination by the processor.

13. The system according to claim 12, further comprising a probe having a single opening configured to extract the sample and the processor is further configured to identify the ratio over time as being characterized within a specified limit as having a slope between and inclusive of zero and minus one in order to indicate that a clean sample will be forthcoming.

14. The system according to claim 12, further comprising a concentric probe having a first opening to extract the sample and a second opening surrounding the first opening and the processor is further configured to identify the ratio over time as being characterized within a specified limit as having a horizontal line to indicate that a clean sample will be forthcoming.

15. The system according to claim 12, wherein the fluid tester is configured to measure at least one of the sample's light absorbance, refractive index, sound speed or its inverse slowness, density, and/or viscosity.

16. The system according to claim 12, wherein the processor is further configured to fit a series of piecewise fits of a quadratic equation to the test data in order to fit the equation to the test data over time.

17. The system according to claim 12, wherein the processor is further configured to estimate an amount of time to continue extracting the sample in order to obtain a clean sample by calculating curve fitting coefficients for the equation.

18. The system according to claim 12, wherein the carrier comprises one of a wireline, a slickline, a drill string, and coiled tubing.

19. The system according to claim 12, wherein the ratio over time one of (i) not being a straight line, (ii) being a straight line with a positive slope, (iii) being a straight line of zero slope with an intercept greater that zero, (iv) being a straight line with negative slope that is more negative than minus one, or (v) being a straight line of slope negative one is indicative of the equation being non-asymptotic.

20. The system according to claim 12, wherein the ratio over time one of (i) being a straight line of zero slope and intercept less than zero or (ii) being a straight line of slope less than zero and greater than minus one is indicative of the equation being asymptotic.

* * * * *